(12) United States Patent
Toda et al.

(10) Patent No.: US 6,445,085 B1
(45) Date of Patent: Sep. 3, 2002

(54) VEHICLE HEADLAMP LEVELING DEVICE

(75) Inventors: Atsushi Toda; Nobuhiko Muramatsu; Hideaki Takeuchi, all of Shizuoka (JP)

(73) Assignee: Koito Manufacturing Co., Ltd, Tokyo (JP)

( * ) Notice: Subject to any disclaimer, the term of this patent is extended or adjusted under 35 U.S.C. 154(b) by 58 days.

(21) Appl. No.: 09/640,234

(22) Filed: Aug. 16, 2000

(30) Foreign Application Priority Data

Aug. 23, 1999 (JP) .......................................... 11-235321

(51) Int. Cl.$^7$ .............................................. B60Q 1/115
(52) U.S. Cl. ........................................ 307/10.8; 315/79
(58) Field of Search ................................ 307/9.1, 10.1, 307/10.8; 315/79.82; 362/460, 466, 467; 701/49

(56) References Cited

U.S. PATENT DOCUMENTS

| | | |
|---|---|---|
| 5,191,530 A | 3/1993 | Hussmann et al. |
| 5,787,370 A * | 7/1998 | Kutscher et al. ............ 307/10.8 |
| 5,877,680 A * | 3/1999 | Okuchi et al. .............. 362/464 |
| 6,193,398 B1 * | 2/2001 | Okuchi et al. .............. 362/464 |

FOREIGN PATENT DOCUMENTS

| | | | |
|---|---|---|---|
| DE | 40 24 913 A1 | 2/1992 | |
| DE | 100 07 273 A1 | 12/2000 | |
| GB | 2341671 A | 3/2000 | ........... B60Q/1/115 |
| GB | 2346982 A | 5/2000 | ........... B60Q/1/115 |
| GB | 2 346 982 A | 8/2000 | |

OTHER PUBLICATIONS

Search Report, dated Jan. 11, 2001.

* cited by examiner

*Primary Examiner*—Fritz Fleming
(74) *Attorney, Agent, or Firm*—Fish & Richardson P.C.

(57) ABSTRACT

A vehicle headlamp leveling device for automatically tilting the headlamps of a vehicle is provided. The light axes of the headlamps based on pitch angles of the vehicle are tilted to level the headlamps relative to a road surface.

12 Claims, 6 Drawing Sheets

VEHICLE HEADLAMP LEVELING DEVICE

FIELD OF THE INVENTION

The invention relates to a vehicle headlamp leveling device for automatically tilting the headlamps of a vehicle, and more particularly to a vehicle headlamp leveling device for vertically tilting the light axes of the headlamps based on pitch angles of the vehicle mainly when it is stationary.

BACKGROUND OF THE INVENTION

A known automatic vehicle headlamp leveling device comprises a pitch angle detection sensor, a vehicle speed sensor and a controller for controlling the driving of actuators based on detected signals from the actuators which are mounted on a vehicle for adjusting the light axes of the headlamps (the reflectors) such that they stay in a given state relative to the surface of a road.

The known automatic vehicle headlamp leveling device is, however, constructed to level the headlamps of a vehicle in real time whether it is running or is at a stop. The device responds to a change in vehicle posture, which occurs when the vehicle accelerates or decelerates, or when luggage is loaded or unloaded or when occupants of the vehicle get in or out of the vehicle. Hence, the number of times the actuators are activated is high and consumption of power is also increased. Moreover, components of driving mechanism such as motors, gears and the like require tremendously high durability, which leads to increase in production costs.

An automatic headlamp leveling device was proposed in JP-A-2000-85458 that reduced the frequency at which the actuators are driven. The proposed device was constructed to control the actuators at certain intervals while the vehicle is at a stop, whereas when the vehicle is in motion, the driving of the actuators is controlled only once as long as the vehicle runs stably.

With the proposed device, when the vehicle turns, slaloms or runs on an irregular surface of a road at a constant speed, a vehicle height sensor, which is a pitch angle detection sensor, detects changes in pitch angle while the vehicle is running. However, when the vehicle is constantly running (i.e. running for a period of time during which the speed is equal to or more than a given value and the acceleration is equal to or less than a given value), the controller determines this condition as stable. Therefore, the headlamps can be inappropriately leveled based on pitch angle data detected during an unstable running condition such as turning, slaloming or running on irregular road surfaces.

When the vehicle turns left at a constant speed, the right-hand side suspension shortens or contracts because of a gravitational acceleration caused by the turn (hereinafter, referred to as turning G), and the vehicle height sensor attached to this suspension on the rear right wheel detects the sinking of the suspension as a tilt along the length of the vehicle as a change in pitch angle. On the other hand, when the vehicle turns right while running at a constant speed, the right-hand side suspension lengthens or expands because of a gravitational acceleration caused by the turn (hereinafter, referred to as turning G), and the vehicle height sensor attached to the suspension detects the expansion or floatation of the suspension as a tilt along the length of the vehicle as a change in pitch angle. A pitch angle data of turns is different from a pitch angle data detected during a stable running condition in which the vehicle runs on a flat surface of a road at a constant speed (which may be close to a pitch angle data detected while the vehicle is at a stop) and is inappropriate for use in leveling the headlamp.

However, the headlamp leveling device determines that a stable running condition is achieved when a speed of the vehicle is equal to or more than a given value and an acceleration of the vehicle is equal to or less than a given value for a predetermined period of time. Then the leveling (controlling) of the headlamps is carried out. If the leveling of the headlamps is carried out to lower the light axes, the visual distance in front of the vehicle is shortened. In terms of safety, this is not a preferable condition. Alternatively, if the leveling (controlling) of the headlamps is carried out to raise the light axes, on-coming vehicles may be subject to glare.

SUMMARY OF THE INVENTION

An object of the invention is to provide a headlamp leveling device that is inexpensive to produce, that provides a long service life by reducing the frequency at which actuators are activated, and that avoids inappropriate leveling of the headlamps while the vehicle is running.

A first implementation of a headlamp leveling device comprises headlamps adapted to be driven by actuators such that light axes thereof are tilted up and/or down relative to the body of a vehicle, control means for controlling the driving of the actuators, vehicle speed detection means for detecting the speed of the vehicle, pitch angle detection means provided on either of left and right suspensions of either of front and rear wheels for detecting a pitch angle of the vehicle, and a storage part for storing pitch angle data of the vehicle detected by the pitch angle detection means, the control means being adapted to control the driving of the actuators based on pitch angle data detected by the pitch angle detection means such that the light axes of the headlamps always stay in a predetermined tilted state relative to the surface of a road, wherein the control means determines whether the vehicle is being at a stop or is running based on outputs from the vehicle speed detection means and controls the driving of the actuators at certain intervals while the vehicle is being at a stop, whereas while the vehicle is running, only when the vehicle is running stably where a state continues for a given length of time in which the speed of the vehicle is equal to or more than a given value, while the acceleration of the vehicle is equal to or less than a given value, the control means controls the driving of the actuators based on pitch angle data taken during the stable running of the vehicle, the headlamp leveling device is adapted to control the driving of the actuators only in a case where respective mean pitch angle data of a plurality of different cycle periods come to coincide with one another after the state continues for a given length of time in which the speed of the vehicle is equal to or more than a given value, while the acceleration of the vehicle is equal to or less than a given value.

In addition, according to a second implementation of the invention, a headlamp leveling device comprises headlamps adapted to be driven by actuators such that light axes thereof are tilted up and/or down relative to the body of a vehicle, control means for controlling the driving of said actuators, vehicle speed detection means for detecting the speed of the vehicle, pitch angle detection means provided on either of left and right suspensions of either of front and rear wheels for detecting the pitch angle of the vehicle, and a storage part for storing pitch angle data of the vehicle detected by the pitch angle detection means, the control means being adapted to control the driving of the actuators based on pitch angle data detected by the pitch angle detection means such that the light axes of the headlamps always stay in a predetermined tilted state relative to the surface of a road, wherein said control means determines whether the vehicle is being at a stop or is running based on outputs from said vehicle speed detection means and controls the driving of the actuators at certain intervals while the vehicle is being at a stop, whereas while the vehicle is running, only when the vehicle is running stably where a state continues for a given length of time in which the speed of the vehicle is equal to or more than a given value, while the acceleration of the vehicle is equal to or less than a given value, the control means controls the driving of the actuators based on pitch angle data taken during the stable running of the vehicle, the headlamp leveling device is adapted to control the driving of the actuators only in a case where the speed of the vehicle is equal to or more than a given value and the acceleration thereof is equal to or less than a given value and where a state continues for a given length of time in which respective mean pitch angle data of a plurality of different cycle periods coincide with one another.

In the headlamp according to the implementations, a reflector in which a light source is securely inserted may be constructed to tilt around a horizontal tilting shaft relative to a lamp body, and the light axis of the reflector (the headlamp) may be arranged to be tilted around the horizontal tilting shaft by the actuator.

The above implementations of the invention are premised on that the leveling (the correction of the light axes) is carried out based on the pitch angle data of the vehicle at a stop. The pitch angle is based on a tilt of the vehicle in the longitudinal direction. The pitch angle data of the vehicle when it is at a stop is more accurate than that of the vehicle when it is running by an extent that the former is less affected by disturbance factors than the latter. Since the driving of the actuators is controlled based on the more accurate pitch angle data, the actuators so controlled can in turn render a more accurate leveling of the headlamp.

Additionally, since the control of the driving of the actuators while the vehicle is at a stop is limited to given time intervals, the frequency at which the actuators are activated is reduced to that extent, and therefore, less power is needed. Also, the wear of the driving mechanism components can be reduced.

The leveling of the headlamps (the correction of the light axes) is based on a set of pitch angle data taken during a stable running condition, which is a state in which for a given length of time the speed of the vehicle is equal to or more than a given value and the acceleration is equal to or less than a given value, (which may be data close to the pitch angle data taken while the vehicle is at a stop). The data of the stable running condition can be used to correct the inappropriate leveling of the headlamps (the correction of the light axes) based on pitch angle data taken when the vehicle is, for example, parked along a slope or riding on a curb.

Furthermore, even if a stable running condition is met, pitch angle data obtained when the vehicle is turning, slaloming or running on badly irregular road surfaces may be inappropriate for leveling purposes. To address this issue, a set of respective mean pitch angle data for a different cycle period Is compared with one another. Whether those mean pitch angle data are appropriate is determined by comparing whether the respective mean pitch angle data coincide with one another. Only when they are determined as appropriate (coincide with one another), the driving of the actuators is controlled. This avoids inappropriate automatic headlamps leveling.

When the vehicle is turning, slaloming or running on irregular road surfaces, the effect of the turning G or the irregularities of the surface of the road are reflected on pitch angle data. The detected pitch angle data is clearly different from pitch angle data collected when the vehicle is running with no turning G acting on the vehicle or running on a road surface free from irregularities.

FIG. 3 is a diagram showing pitch angles detected on the vehicle that is slaloming. In the figure, a character A0 denotes the original waveform of pitch angle data detected, a character A1 denotes the waveform of one-second mean pitch angle data, a character A2 denotes the waveform of two-second mean pitch angle data, and a character A3 denotes the waveform of three-second mean pitch angle data. When considering the respective mean pitch angle data of a plurality of cycle periods (1 second, 2 seconds, 3 seconds) in FIG. 3, as the cycle period becomes longer (1 second <2 seconds <3 seconds), the effect of change in signal from the vehicle height sensor appears later.

Consequently, unless there are factors affecting the pitch angle data, mean pitch angle data of different cycle periods will be identical to one another (i.e. it substantially coincides with one another), whereas if there are factors affecting the pitch angle data (for example, turning, slaloming or running on irregular road surfaces), mean pitch angle data of different cycle periods will be different from one another (it does not coincide with one another).

Whether the respective mean pitch angle data of the different cycle periods are appropriate is determined by deciding whether the respective mean pitch angle data coincide with one another. If they are appropriate, the driving of the actuator is arranged to be controlled, whereas if they are not, then the driving of the actuator is arranged not to be controlled.

According to the first implementation of the invention, respective mean pitch angle data of two different cycle periods, for example, one-second mean pitch angle data and three-second mean pitch angle data, are compared with one another. However, even if they are different pitch angle data as a result of the action of a certain disturbance factor on the vehicle, it is possible that both data may coincide at some points (e.g. positions P1, P2, P3, P4 in FIG. 3). According to the second implementation of the invention, not only are the respective mean pitch angle data, for example, one-second mean pitch angle data and three-second mean pitch angle data, compared with one another but also the appropriateness of those data is determined based on a coincidence of the two data over a given length of time. Therefore, a risk of the headlamp being leveled based on pitch angle data detected while a certain disturbance factor is acting on the vehicle is eliminated.

According to a third implementation of the invention, the mean pitch angle data of at least three durations of cycle periods are arranged to be compared with one another. Therefore, chances of leveling the headlamps based on pitch angle data detected while a certain disturbance factor is acting on the vehicle are reduced substantially or eliminated. Also, the time required to level the headlamps is short.

According to the first implementation of the invention, respective mean pitch angle data of two different cycle periods, for example, one-second mean pitch angle data and three-second mean pitch angle data, are compared with one another. Since the two mean pitch angle data colleted under a disturbance factor impinging on the vehicle may happen to coincide with one another, there may be a risk that the headlamp is leveled based on the inappropriate pitch angle data.

According to the second implementation of the invention, since the leveling of the headlamp is not carried out until the respective mean pitch angle data are compared with one another and also until a given length of time elapses. Thus, a certain time may be required before the headlamp is leveled.

According to the third implementation of the invention, the appropriateness of the respective mean pitch angle data is determined by deciding whether the respective mean pitch angle data of at least three different durations of cycle periods coincide with one another. Thus, the headlamp can be prevented from being leveled based on pitch angle data taken while the vehicle is under the influence of a disturbance factor. Furthermore, the time required to level the headlamp is short.

DETAILED DESCRIPTION OF THE INVENTION

A mode for carrying out the invention will be described based on implementations of the invention.

Figure 1:
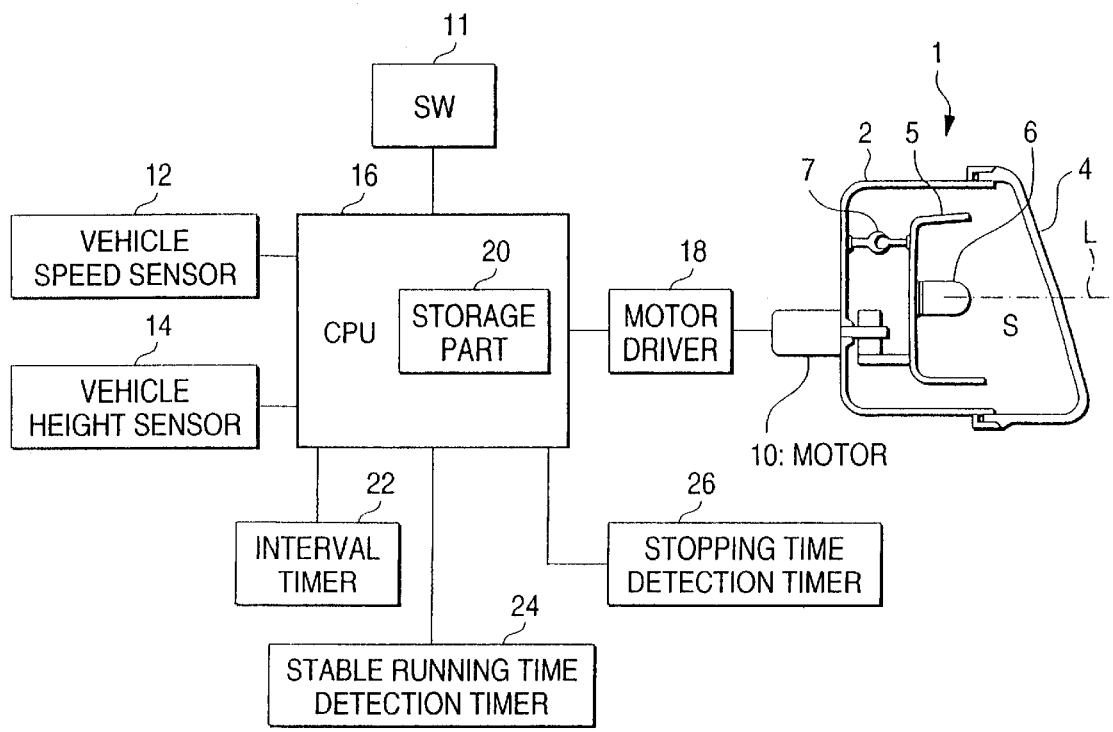
FIG. 1 is a diagram showing the overall construction of a headlamp leveling device according to an implementation of the invention.
Figure 2:
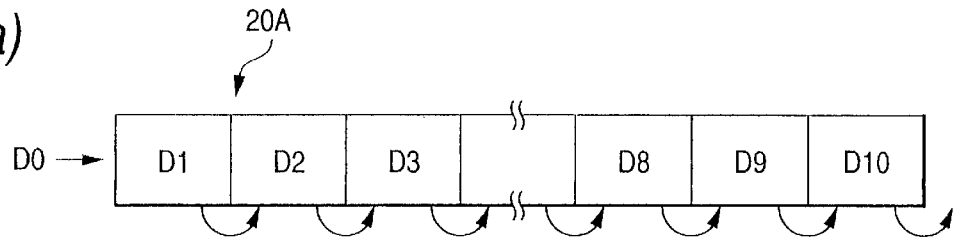
FIGS. 2a, b are a diagram showing the construction of a storage part according to an implementation of the invention.
Figure 2:
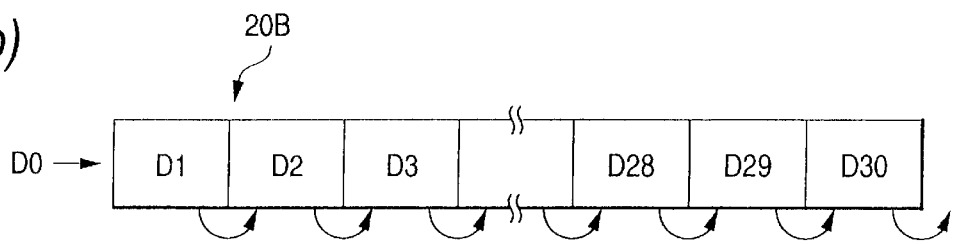
Figure 3:
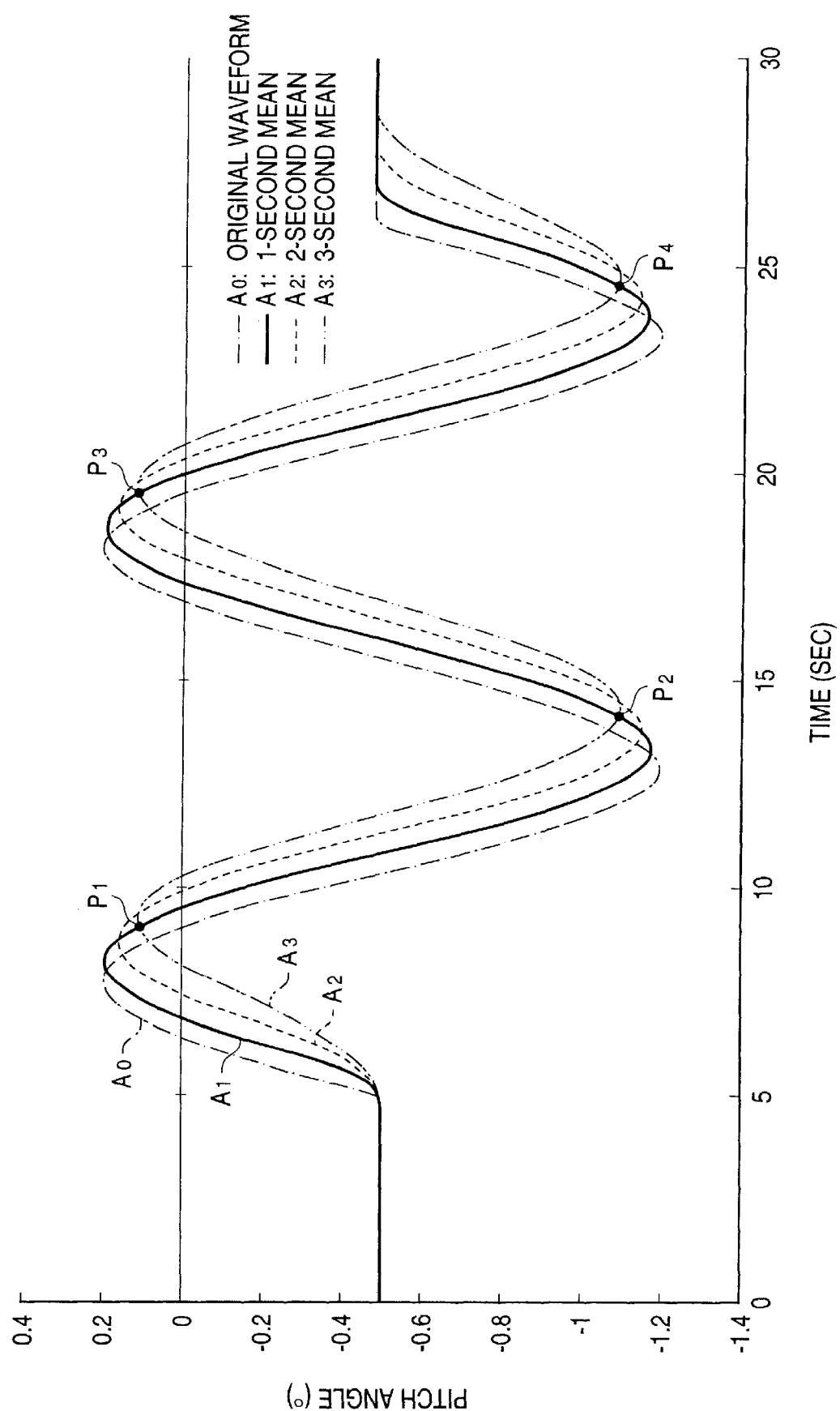
FIG. 3 is a diagram showing real-time pitch angle data, one-second mean pitch angle data, two-second mean pitch angle data and three-second mean pitch angle data, detected during slaloming.
Figure 4:
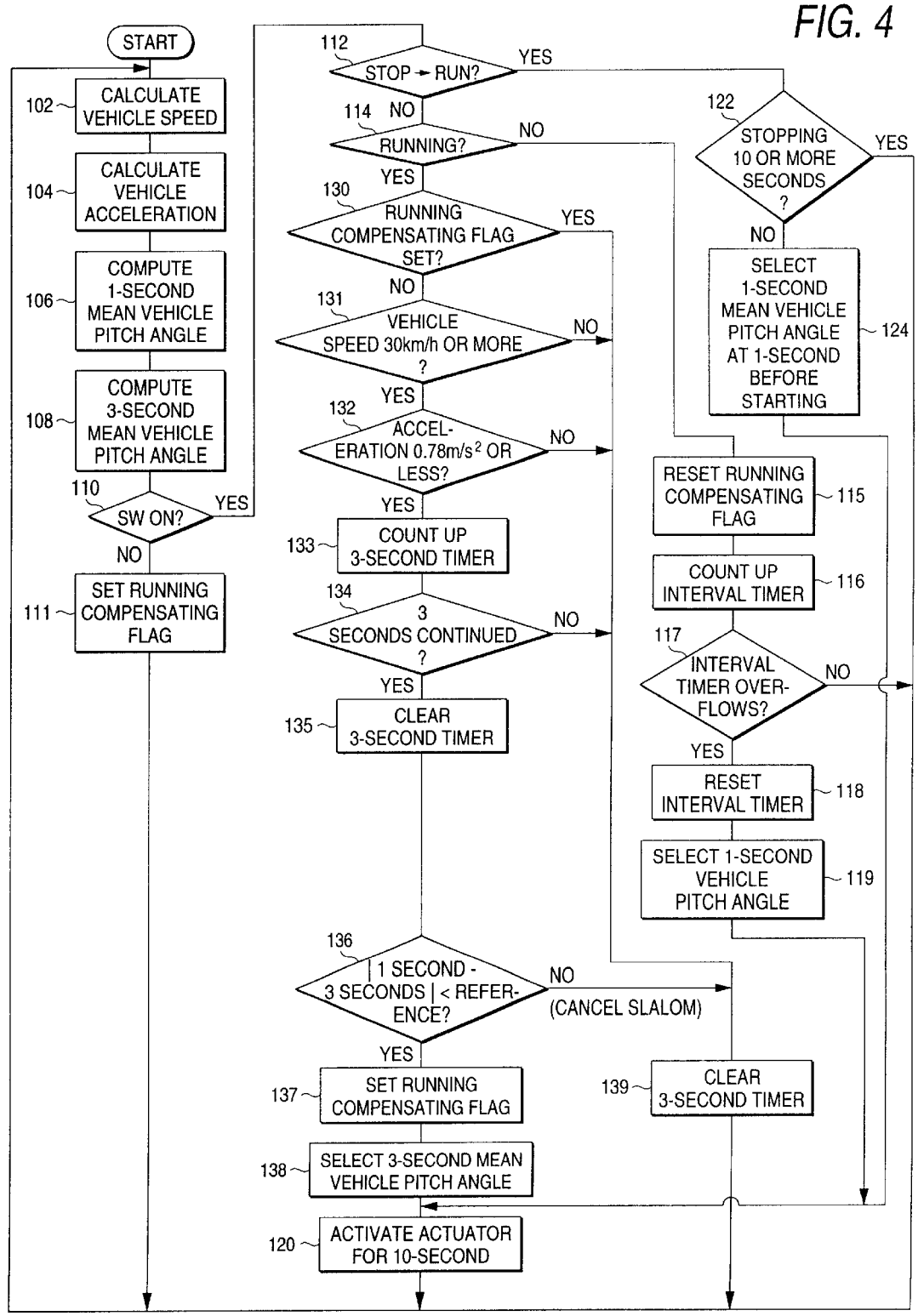
FIG. 4 is a flowchart for a CPU acting as a control part of the headlamp leveling device according to an implementation of the invention.

FIGS. 1 to 4 show one implementation of the invention. FIG. 1 is a diagram showing the overall construction of a headlamp leveling device according to a first implementation of the invention. FIG. 2 is a diagram showing the construction of a storage part. FIG. 3 is a diagram showing pitch angle data, one-second mean pitch angle data, two-second mean pitch angle data, and three-second mean pitch angle data, all in real time during slaloming. FIG. 4 is a flowchart of a CPU, which is a control part of the headlamp leveling device.

FIG. 1 shows a vehicle headlamp 1 and a frontal lens 4 assembled to a frontal opening of a lamp body 2 to provide a lamp compartment S. A parabolic reflector 5 having a bulb 6 as a light source securely inserted in the reflector 5 is supported in the lamp compartment S to tilt around a horizontal tilting shaft 7 (a shaft normal to the surface of the diagram of FIG. 1). The reflector 5 is also constructed so as to be tilted up and/or down for adjustment by a motor 10 which is an actuator.

The automatic leveling device for the headlamp 1 comprises the motor 10 for acting as an actuator for tilting in vertical directions for adjusting a light axis L of the headlamp 1, a lighting switch 11 for the headlamp 1, a vehicle speed sensor 12 for detecting the speed of the vehicle, a vehicle height sensor 14 partially constituting a vehicle pitch angle detecting means, a CPU 16 for determining the operation of the headlamp 1 or whether the headlamp 1 is turned on or off and the operation of the vehicle or whether the vehicle is running or at a stop based on a signal from the vehicle speed sensor 12, for operating the pitch angle of the vehicle and the acceleration thereof based on a signal from the vehicle height sensor 14 and for outputting based on this pitch angle data so operated a control signal to a motor driver 18 for driving the motor 10, a storage part 20 for storing the pitch angle data of the vehicle detected by the vehicle height sensor 14 and operated by the CPU 16, an interval timer 22 for setting timings at which the motor 10 is driven, and a vehicle stable running time detection timer 24.

When a signal is entered into the CPU 16 from the vehicle speed sensor 12, the CPU 16 determines whether the vehicle is at a stop or in motion based on the signal so entered. If the vehicle is determined to be at a stop, the motor 10 is controlled at certain intervals, whereas if the vehicle is determined to be in motion, the motor 10 is controlled only once when stable running conditions are met and one-second mean pitch angle data and three-second mean pitch angle data coincide with one another.

In addition, when a signal is entered into the CPU 16 from the vehicle height sensor 14, the CPU 16 calculates the tilt in the longitudinal direction (the pitch angle) of the vehicle from the signal so entered that corresponds to the displacement of the suspension. In the vehicle shown in this implementation, a one-sensor system is adopted in which the vehicle height sensor 14 is provided only on the rear right suspension. The pitch angle of the vehicle can be estimated from a variation in vehicle height detected by the vehicle height sensor 14. The CPU 16 sends signals to the motor driver 18 to tilt the light axis L in a direction that cancels the pitch angle so detected.

The storage part 20 can store the pitch angle data detected by the vehicle height sensor 14 and used for calculation by the CPU 16. As shown in FIG. 2A, a storage portion 20A of the storage part 20 can store ten pieces of data D1 to D10 sampled for one second at 100 ms intervals. A storage portion 20B of the storage part 20 can store thirty pieces of data D1 to D30 sampled for three seconds at 100 ms intervals. The storage portions 20A, 20B are arranged to take in new data each 100 ms and to discard old data (old data is arranged to be replaced with new data in a sequential fashion).

The CPU 16 determines whether the lighting switch is switched On or Off, and it sends signals to the motor driver 18 to drive the motor 10 only when the lighting switch is switched On.

While the vehicle is stationary, the CPU 16 outputs to the motor driver 18 for driving the motor 10 only when a given interval time set in an interval timer 22 is exceeded.

The range the headlamp 1 can tilt is fixed. Therefore, the maximum. time required for leveling the headlamp once by the motor 10 is fixed. If the interval time during the motor is driven is shorter than the maximum driving time of the motor 10 required to level the headlamp at one time, the motor 10 has to follow the changes in vehicle posture (pitch angle). A change in posture occurs every time occupants of the vehicle get in or out, which results in driving the motor 10 frequently. The motor may rotate clockwise and counterclockwise and stop repeatedly, and the light axis L may never reach a target position. This leads to a reduction of the life of the motor.

To address this issue, the interval during the motor is driven can be set longer (for example, 10 seconds) than the maximum driving time of the motor 10 needed to level the headlamp at one time, so that the target position of the light axis does not change during the headlamp is leveled (during the driving of the motor).

The CPU 16 controls the driving of the motor 10 based on the latest one-second mean pitch angle data (data D1 to D10) stored in the storage part 20 (a mean value of the storage portion 20A) while the vehicle is stationary. However, when the vehicle starts moving, the CPU 16 is designed to control the driving of the motor 10 based on a one-second mean pitch angle data stored in the storage portion 20B one second prior to the start of the vehicle (a mean value of data D11 to D20).

However, the pitch angle data detected after the accelerator pedal is depressed and before the vehicle sensor detects the vehicle's movement is not necessarily accurate because the vehicle's rear dips when the vehicle starts. In addition, no more than a second is required for the vehicle sensor to detect the start of the vehicle. Therefore, the headlamp can be accurately leveled by using a one-second mean pitch angle data one second prior to the start of the vehicle as data taken while the vehicle is stationary.

The CPU 16 controls the driving of the motor 10 based on the latest one-second mean pitch angle data detected by the vehicle height sensor 14 while the vehicle is stationary. However, the CPU 16 may improperly level the headlamps (correction of the light axes) based on pitch angle data obtained from a vehicle parked along a slope or with the wheels partly riding on a curb. To compensate for the improper headlamp leveling (light axis correction), the CPU 16 may control the driving of the motor 10 only during a stable running condition and only once, based on pitch angle data detected during the stable running condition. If the pitch angle data detected while the vehicle is stationary is proper (if the vehicle is not parked along a slope or with part of the wheels riding on a curb), pitch angle data detected during the stable running condition would be substantially equal to that detected while the vehicle is stationary. Therefore, the light axis position resulting from the pitch angle data detected during the stable running condition can be substantially equal to a light axis position resulting from pitch angle data obtained from the stationary vehicle.

The CPU 16 detects signals from the vehicle height sensor 14, performs operations at relatively fast sampling time (100 ms) and calculates one-second mean pitch angle data and three-second mean pitch angle data. While the vehicle is stationary, the CPU 16 can control the motor 10 based on the one-second mean pitch angle data at every 10 second interval. If the vehicle is moving, in order to eliminate disturbance, the CPU 16 is designed to control the motor 10 only if the speed of the vehicle is equal to or more than a reference value, and the acceleration of the vehicle is equal to or less than a reference value. Moreover, such a state (i.e., a state in which the speed of the vehicle is equal to or more than a reference value, and the acceleration thereof is equal to or less than a reference value) must continue for a given length of time.

If a surface of the road is rough and irregular, the vehicle may not be able to run more than 30 km/h and drastic acceleration and deceleration may change the posture of the vehicle. Therefore, it may be appropriate to limit the reference value of acceleration to 0.78 m/s$^2$ or less. Thus, a speed of 30 km/h or more, an acceleration of 0.78 m/s$^2$ or less, and the continuation of such a state for 3 seconds or more can be defined as the stable running condition. The pitch angle of the vehicle is calculated only when those conditions are met. Therefore, abrupt detections of abnormal values, and hence, the effect of such detections can be eliminated.

Whether the stable running condition continues for 3 seconds or more is determined by allowing the CPU 16 to run a stable running time detection timer 24 adapted to start operating when the vehicle speed of 30 km/h or more and vehicle acceleration of 0.78 m/s$^2$ or less are confirmed.

However, even if the stable running condition (the state in which the vehicle speed is 30 km/h or more and vehicle acceleration of 0.78 m/s$^2$ or less continues for 3 seconds or more) is met, appropriate pitch angle may not be measured when the vehicle turns, slaloms or runs on irregular road surfaces.

To address this issue, the CPU 16 compares a mean value of pitch angle data for 1 second (one-second mean pitch angle data) stored in the storage portion 20A and a mean value of pitch angle data for 3 seconds (three-second mean pitch angle data) stored in the storage portion 20B and determines whether or not both mean values are substantially equal to or coincide with one another. Only when they are determined to be equal to one another, the CPU 16 controls the motor 10. Consequently, any inappropriate automatic headlamp leveling is avoided.

In other words, if no factor affects the pitch angle data, the one-second mean pitch angle data and the three-second mean pitch angle data should substantially coincide with one another. If there is present some factor affecting the pitch angle data such as turning, slaloming or running on irregular road surfaces, the one-second mean pitch angle data and the three-second mean pitch angle data will not coincide with one another. Therefore, whether the pitch angle data are appropriate or not (or whether the movement is abnormal) is determined by comparing the difference between the one-second mean pitch angle data and the three-second mean pitch angle data to a predetermined reference value (for example, 0.1 degree). If the data are determined to be appropriate, the motor 10 is controlled. If the data are not appropriate (or the movement is determined to be abnormal), the motor 10 is not controlled.

The control of the motor 10 by the CPU 16 which is a control unit will be described with reference to a flowchart shown in FIG. 4.

In steps 102, 104, the vehicle speed and acceleration are calculated from outputs from the vehicle speed sensor 12, respectively. In steps 106, 108, one-second mean pitch angle data and three-second mean pitch angle data are calculated from outputs from the vehicle height sensor 14, respectively. In step 110, whether or not the headlamps are illuminated is determined from outputs from the lighting switch 11. If the headlamps are illuminated, the flow moves to step 112.

In step 112, whether or not the vehicle has shifted from stop to start is determined. In other words, whether or not the vehicle has shifted from being stationary to being in motion is determined. If YES, in Step 122, whether or not the length of time the vehicle is at a stop is equal to or more than 10 seconds is determined by a stopping time detection timer 26. If the stopping time is less than 10 seconds, the flow advances to Step 124. In Step 124, one second before the vehicle starts to move, one-second mean pitch angle data (a mean value of D11 to D20) stored in the storage part 20 is selected. In Step 120, the CPU 16 outputs to the motor driver 18 to drive the motor 10 based on the one-second mean pitch angle data one second before the vehicle starts to run, and then the flow returns to Step 102. However, in Step 112, if the stopping time is 10 or more seconds, then the flow returns to Step 102 without doing anything.

In addition, in Step 112, if the vehicle has not shifted from being stationary to being in motion, then, whether or not the vehicle is moving is determined in Step 114. If the vehicle is stationary in Step 114, a running compensating flag is reset in Step 115. That is, if the motor was controlled based on the pitch angle data detected while the vehicle was moving, in step 115, the running compensating flag is reset although a running compensating flag is designed to be set in Step 137, which will be described later.

In Step 116, the interval timer 22 is counted, and if it is determined that 10 seconds has elapsed in Step 117, the interval timer 22 is reset in Step 118. In Step 119, one-second mean pitch angle data is selected. In Step 120, the CPU outputs to the motor driver 18 to drive the motor 10 based on the one-second mean pitch angle data, and then the flow returns to Step 102.

However, if it is determined that 10 seconds has not yet elapsed in Step 117, then the flow returns to Step 102 without driving the motor 10.

If it is determined that the vehicle is in motion in Step 114, then whether or not the running compensating flag is set (whether or not the light axes were corrected or the leveling was carried out while running) is determined in Step 130. If the answer is NO, in other words, if the running compensating flag has not been set (i.e. the light axes were no corrected or the leveling was not carried out while moving), then whether or not the vehicle speed is equal to or more than the reference value (30 km/h) is determined in Step 131. If YES, that is, if the vehicle speed is 30 km/h or more, then whether or not the acceleration is equal to or less than the reference value (0.78 m/s$^2$) is determined in Step 132. If YES (0.78 m/s$^2$ or less), then the stable running time detection timer 24 is started in Step 133. In Step 134, whether or not the state in which the vehicle speed is equal to or more than 30 km/h and the vehicle acceleration is 0.78 m/s$^2$ or less has lasted for the given length of time (3 seconds) or more is determined.

If the answer is yes in Step 134, then the count of the stable running time detection timer 24 is cleared in Step 135, and the flow continues to Step 136.

Whether or not the difference between the one-second mean pitch angle data and the three-second mean pitch angle data is less than the reference value (0.1 degree) is determined in Step 136. If the difference is less than the reference value, the flow continues to Step 137, where the running compensating flag is set. Then, in Step 138, the three-second mean pitch angle data is selected. In Step 120, the CPU outputs to the motor driver 18 to drive the motor 10 based on this three-second mean pitch angle data. The flow returns to Step 102.

Additionally, in Step 130, if the running compensating flag is set (i.e. if the light axes were corrected or the leveling was carried out while running), or if the answer is NO in Steps 131, 132, respectively,(if the vehicle speed is less than 30 km/h, while the vehicle acceleration exceeds the reference value 0.78 m/s$^2$), then the count of the stable running time detection timer 24 is cleared in Step 139. Then the flow returns to Step 102.

In Step 134, if the answer is NO (i.e. the vehicle speed is equal to or more than the reference value of 30 km/h and the vehicle acceleration is equal to or less than the reference value of 0.78 m/s$^2$, but such condition do not continue for 3 or more seconds), and in Step 136 if the answer is NO (i.e. the difference between the one-second mean pitch angle data and the three-second mean pitch angle data is equal to or more than the reference value), the flow is returned to Step 102 without driving the motor 10.

Figure 5:
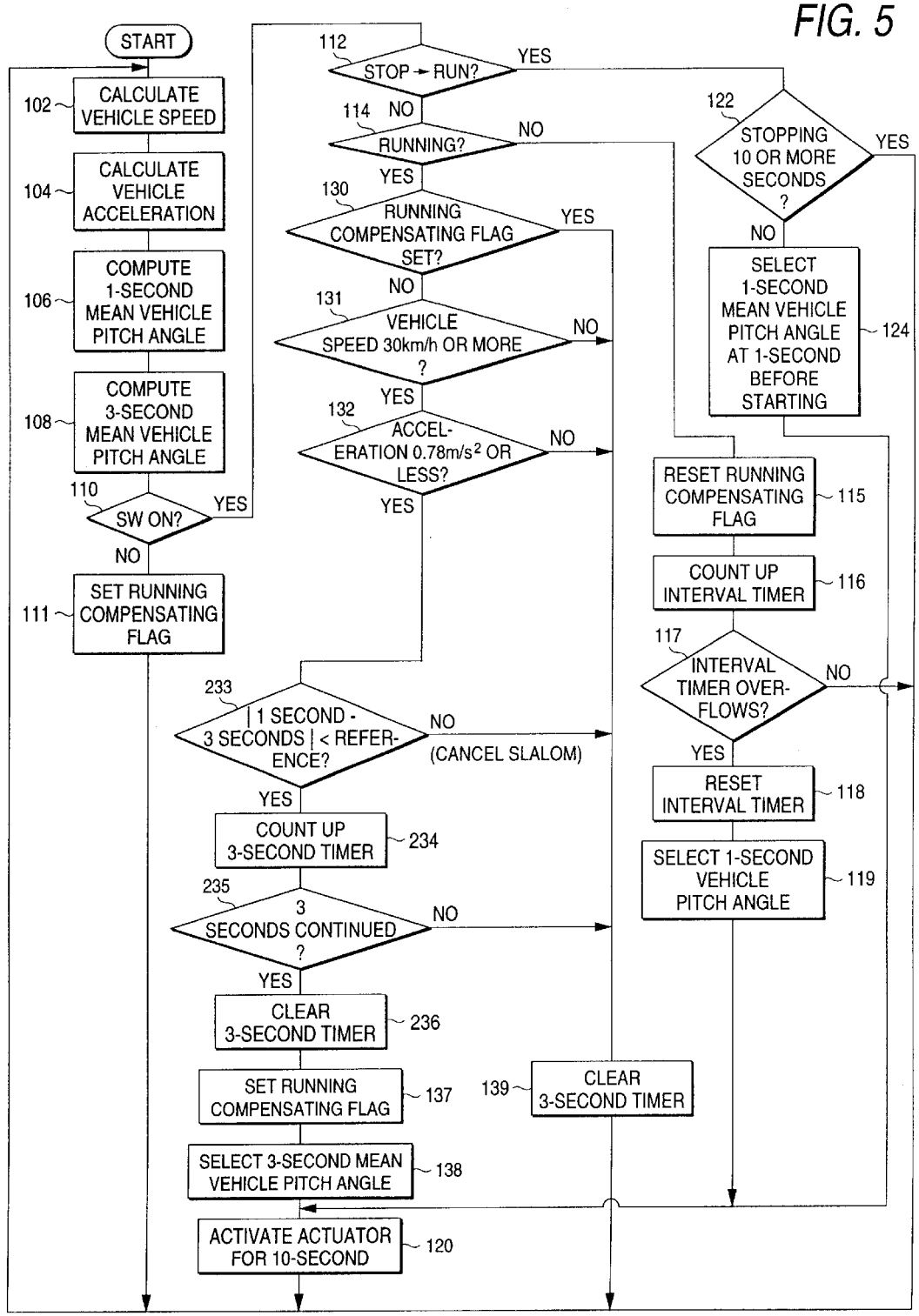
FIG. 5 is a flowchart for a CPU acting as a control part of a headlamp leveling device according to an implementation of the invention.

FIG. 5 is a diagram showing a flowchart for a CPU which is a control part of a headlamp leveling device according to a second implementation of the invention.

In the first implementation, the driving of the motor is designed to be controlled only if the vehicle speed is equal to or more than the reference value of 30 km/h, the vehicle acceleration is equal to or less than the reference value of 0.78 m/s2, and such condition continues for 3 or more seconds, and additionally the difference between the one-second mean pitch angle data and the three-second mean itch angle data is equal to or less than the reference value. However, in the second implementation, the driving of the motor is controlled only if the vehicle speed is equal to or more than the reference value of 30 km/h, the vehicle acceleration is equal to or less than the reference value of 0.78 m/s$^2$, and the state in which the difference between the one-second mean pitch angle data and the three-second mean pitch angle data is equal to or less than the reference value continues for 3 or more seconds.

The processing flow of the second implementation is different from the processing flow of the first implementation in the steps between steps 132 and 137. The remaining part of the processing flow of the second implementation is identical to that of the first implementation. Hence, only the part of the processing flow that is different will be described with like reference numerals associated with like portions. The description of the remaining part thereof will be omitted.

In Step 233, whether or not the difference between the one-second mean pitch angle data and the three-second mean pitch angle data is less than the reference value (0.1 degree) is determined. If the answer is yes (i.e. if the difference is less than the reference value), then the flow moves to Step 234, where the stable running time detection timer 24 is counted. In Step 235, whether or not a state in which the difference between the one-second mean pitch angle data and the three-second mean pitch angle data is less than the reference value continues for 3 or more seconds is determined. If the answer is YES (i.e. the state continues for 3 or more seconds) in Step 235, the flow continues to Step 236, where the stable running time detection timer 24 is cleared. Then the flow continues to Step 137.

However, if the difference between the one-second mean pitch angle data and the three-second mean pitch angle data is equal to or more than the reference value in Step 233, then in Step 139, the count at the stable running time detection timer 24 is cleared and the flow is returned to Step 102. In addition, if it is determined that the condition continues for less than 3 seconds in Step 235, then the flow is returned to Step 102.

In the first implementation, the appropriateness of the data is determined based on whether or not the difference between the respective mean pitch angle data (the one-second mean pitch angle data and the three-second mean pitch angle data) of the two different cycle periods is simply equal to or less than the reference value. To be appropriate, the data must also satisfy the conditions that vehicle speed is 30 km/h or more, the vehicle acceleration is 0.78 m/s$^2$ or less and such vehicle's speed and acceleration continue for 3 seconds. However, one-second and three-second mean pitch angle data may happen to coincide with one another even if they are affected by disturbance factors (for example, under a running condition such as turning, slaloming or running on irregular road surfaces). Therefore, there may be a chance that the headlamps is leveled based on the pitch angle data detected during such an abnormal running condition.

In the second implementation, however, the data are determined as being appropriate if the vehicle speed is 30 km/h or more, the vehicle acceleration is 0.78 m/s$^2$ or less and the state in which the difference between the one-second mean pitch angle data and the three-second mean pitch angle data is equal to or less than the reference value, and that the above state continues for 3 or more seconds. Since the driving of the motor is designed to be controlled when the appropriateness of the data is confirmed in the way as described above, the one-second mean pitch angle data and the three-second mean pitch angle data should not coincide with one another when they are affected by disturbance factors (such an abnormal running as turning, slaloming or running on rough road surfaces). Therefore, chances of motor being controlled based on pitch angle data detected under an abnormal running condition are eliminated.

Figure 6:
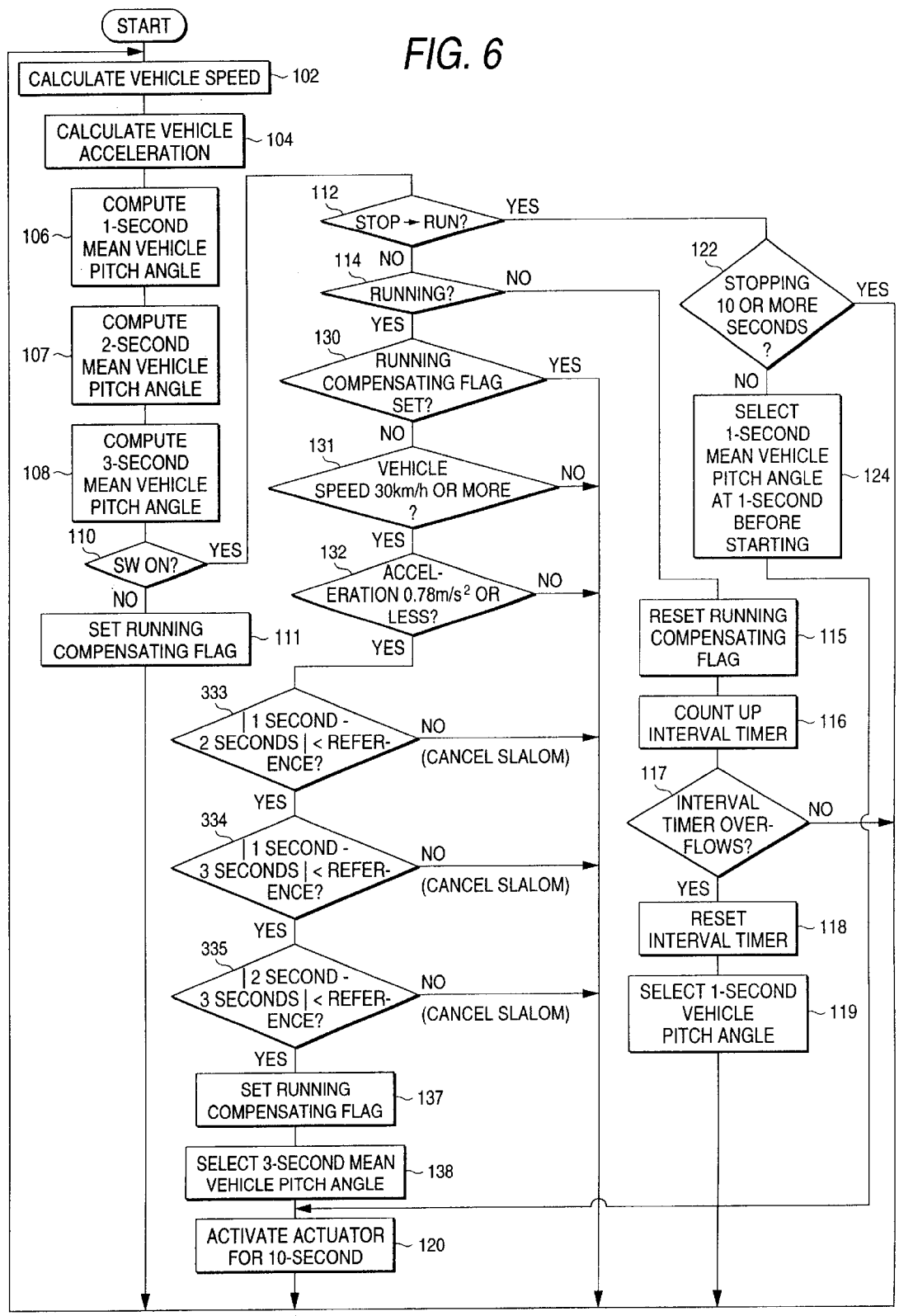
FIG. 6 is a flowchart for a CPU acting as a control part of a headlamp leveling device according to an implementation of the invention.

FIG. 6 is a diagram showing a flowchart for a CPU which is a control part of a headlamp leveling device according to a third implementation of the invention.

In the foregoing two implementations, the appropriateness of the data is determined by using for comparison the one-second mean pitch angle data and the three-second mean pitch angle data as respective mean pitch angle data of different cycle periods. In the third implementation, the appropriateness of data is determined by using for comparison, respective mean pitch angle data (one-second mean pitch angle data, two-second mean pitch angle data and three-second mean pitch angle data) of three different cycle periods (1 second, 2 seconds, and 3 seconds).

The processing flow of the third implementation is different from that of the first implementation in the flow described as specific to the third implementation (mainly part of the processing flow between Steps 132 and 137). The remaining part steps remain the same as that of the first implementation. Therefore, only the part of the processing flow specific to this third implementation will be described. The description of the remaining part will be omitted. Like reference numerals indicate like portions.

Step 107 is provided between Steps 106 and 108, where two-second mean pitch angle data is computed. In Step 333, whether or not the difference between the one-second mean pitch angle data and the two-second mean pitch angle data is equal to or less than a reference value is determined. Then, if the difference is less than the reference value, the flow continues to Step 334. In Step 334, whether or not the difference between the one-second mean pitch angle data and the three-second mean pitch angle data is equal to or less than a reference value is determined. Then, if the difference is less than the reference value, the flow continues to Step 335. In Step 335, whether or not the difference between the two-second mean pitch angle data and the three-second mean pitch angle data is equal to or less than a reference value is determined. Then, if the difference is less than the reference value, the flow continues to Step 137.

However, if the difference between the one-second mean pitch angle and the two-second mean pitch angle data is equal to or more than the reference value in Step 333, or if the difference between the one-second mean pitch angle and the three-second mean pitch angle data is equal to or more than the reference value in Step 335, or if the difference between the two-second mean pitch angle and the three-second mean pitch angle data is equal to or more than the reference value in Step 337, the flow continues to Step 102 without driving the motor 10, respectively.

In the first implementation, although it is rare, the headlamp leveling may be based on the pitch angle data detected under an abnormal running condition. In the second implementation, in addition to the time required until the two mean pitch angle data are compared with one another, a given length of time (3 seconds) has to elapse before the headlamp leveling starts, and therefore, a long period of time may be required before the leveling actually starts. In the third implementation, however, since the data are determined as being appropriate (as data detected under a normal running condition not under an abnormal running condition) only if the vehicle speed is 30 km/h or more, the vehicle acceleration is 0.78 m/s2 or less, and all the respective mean pitch angle data (the one-second mean pitch angle data, the two-second mean pitch angle data and the three-second mean pitch angle data) of the three different cycle periods coincide with one another, the headlamp can be leveled without being affected by the disturbance factors as in the first implementation. Also, contrary to the second implementation, a long period of time is not necessary before the leveling is carried out.

Figure 7:
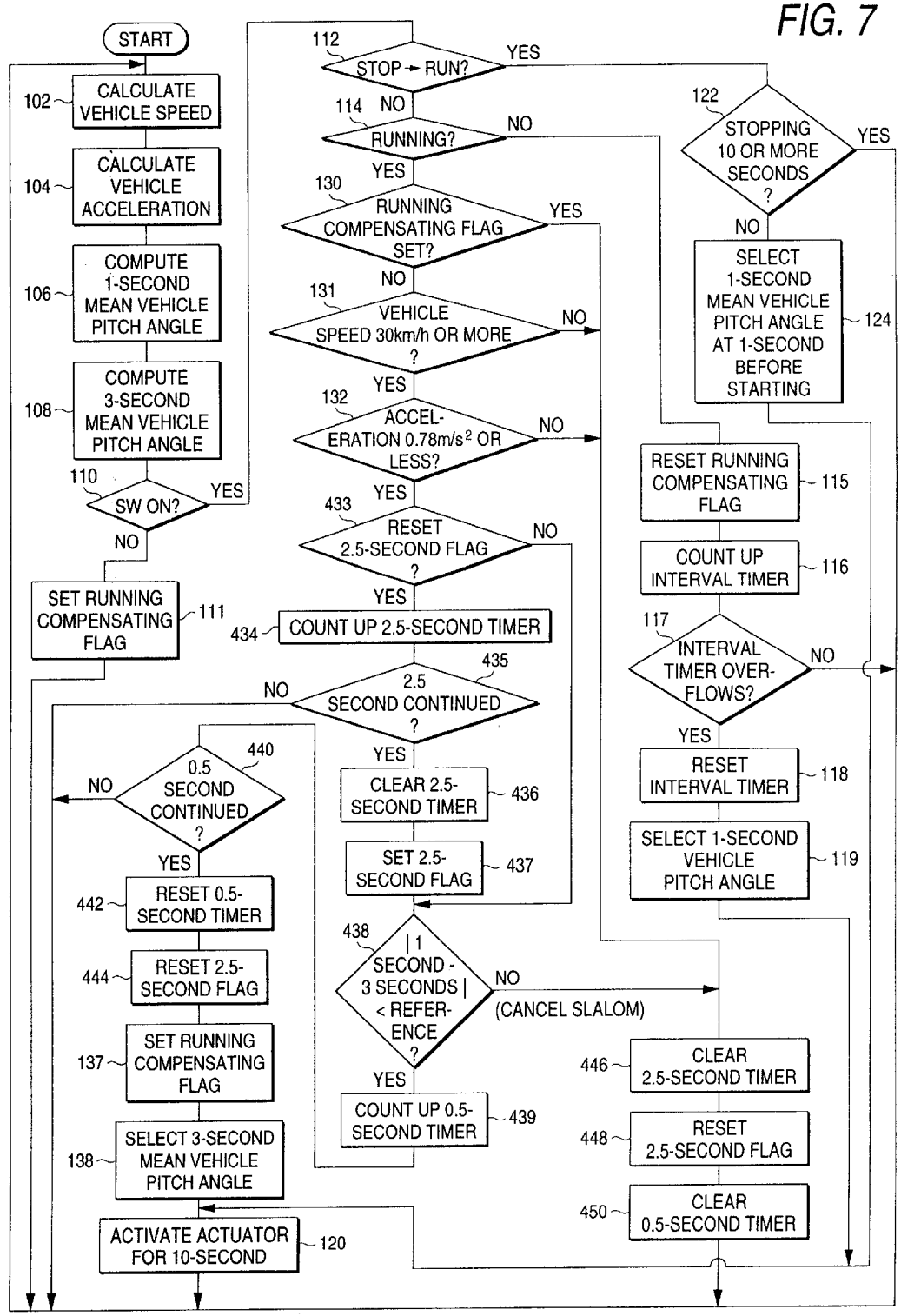
FIG. 7 is a flowchart for a CPU acting as a control part of a headlamp leveling device according to an implementation of the invention.

FIG. 7 is a diagram showing a flowchart for a CPU which is a control part of a headlamp leveling device according to a fourth implementation of the invention.

In the first implementation, the actuator is controlled only if the vehicle speed is equal to or more than the reference value of 30 km/h, the vehicle acceleration is equal to or less than the reference value of 0.78 m/s2, and such conditions continue for 3 or more seconds. Additionally, the difference between the one-second mean pitch angle data and the three-second mean itch angle data should be equal to or less than the reference value. However, in this fourth implementation, the actuator is controlled only if the vehicle speed is equal to or more than the reference value of 30 km/h, the vehicle acceleration is equal to or less than the reference value of 0.78 m/s$^2$, such conditions continue for 2.5 or more seconds, and only if the difference between the one-second mean pitch angle data and the three-second mean pitch angle data is equal to or less than the reference value is sustained for 0.5 or more seconds.

The processing flow of the fourth implementation is different from the processing flow of the first implementation in the part just described above, which corresponds to steps between steps 132 and 137. The remaining part of the processing flow of the fourth implementation is identical to that of the first implementation, and therefore, only the different part will be described. The description of the remaining part will be omitted. Like reference numerals indicate like portions.

In Step 433, whether or not a 2.5-second flag is reset is determined. If the flag is already reset, then the flow continues to Step 434, where a 2.5-second timer is started. Furthermore, in Step 435, whether the vehicle speed of 30 km/h or more and the vehicle acceleration of 0.78 m/s$^2$ or less continue for 2.5 or more seconds is determined from the output of the 2.5-second timer. If the vehicle speed of 30 km/h or more and the vehicle acceleration of 0.78 m/s$^2$ or less continue for 2.5 or more seconds, the flow advances to Step 436, at which point the 2.5-second timer is cleared. In Step 437, the 2.5-second flag is reset. Then the flow continues to Step 438.

However, if the 2.5-second flag has not yet been reset in Step 433, then the flow advances to Step 438. In addition, if the vehicle speed of 30 km/h or more and the vehicle acceleration of 0.78 m/s² or less do not continue for 2.5 or more seconds in Step 435, then the flow returns to Step 102.

In Step 438, whether or not the difference between the one-second mean pitch angle data and the three-second mean pitch angle data is equal to or less than the reference value (0.1 degree) is determined. If the difference is less than the reference value, the flow advances to Step 439, where a 0.5-second timer is counted up. Then, the flow continues to Step 440.

In Step 440, whether or not the state in which the difference between the one-second mean pitch angle data and the three-second mean pitch angle data is equal to or less than the reference value (0.1 degree) continues for 0.5 or more seconds is determined. If the state in which the difference between the one-second mean pitch angle data and the three-second mean pitch angle data is equal to or less than the reference value continues for 0.5 or more seconds in Step 440, then the flow moves to Step 442, where the 0.5-second timer is reset. Then, the flow continues to Step 444, where the 2.5-second flag is reset. Then the flow moves to Step 137.

However, if the difference between the one-second mean pitch angle data and the three-second mean pitch angle data is equal to or more than the reference value in Step 438, the flow advances to Step 446, where the 2.5-second timer is cleared. Then, the flow continues to Step 448, where the 2.5-second flag is reset. Then the flow continues to Step 450, where the 0.5-second timer is cleared. The flow then returns to Step 102.

The fourth implementation is similar to the second implementation (seen in FIG. 5), except that the time needed before the headlamp is leveled is made shorter than that required in the second implementation.

Note that while in the foregoing implementations, the interval (time) for the actuator (motor) is set to 10 seconds, the present invention is not limited to 10 seconds. The interval may be set optionally relative to the maximum driving time of the actuator (motor).

In addition, while in the foregoing implementations the stable running conditions are described as the vehicle speed of 30 km/h or more, the vehicle acceleration of 0.78 m/s² or less, and those conditions continue for 3 or more seconds, the present invention is not limited to those values.

Furthermore, while in the foregoing implementations the one-second, two-second and three-second mean pitch angle data are used as examples, the cycle period (1 second, 2 seconds, and 3 seconds) is not limited to those values. Mean pitch angle data of three or more different cycle periods may be used for comparison.

Moreover, in the foregoing implementations the automatic headlamp leveling is described as being applied to the reflector-movable type headlamps in which the reflector 5 is provided in such a manner as to be tiltable relative to the lamp body 2 which is fixed to the body of the vehicle. The present invention may be equally applied to a unit-movable type headlamp in which a lamp body and reflector unit is provided in such a manner as to be tiltable relative to the lamp housing which is fixed to the body of the vehicle.

According to the headlamp leveling devices as set forth in the first and second implementations of the invention, the driving of the actuators for performing the automatic leveling of the headlamps is effected when the vehicle is at a stop (stationary) and when it is running (moving). The driving of the actuators is limited to given intervals while the vehicle is at a stop; however, while the vehicle is running, the driving of the actuator is carried out only once. Thus, the number of operation of the actuators can be reduced. Power consumption can be saved. The wear and tear of components of the driving mechanism can be also reduced. Therefore, the automatic headlamps leveling device can be provided which is inexpensive and operates accurately.

In addition, the headlamp is not automatically leveled under abnormal running conditions such as turning, slaloming or running on irregular road surfaces which act as disturbance factors affecting pitch angle data. The automatic headlamp leveling is carried out based on appropriate pitch angle data detected during true stable running condition in which appropriate pitch angle data can be detected free from the influence of disturbance factors. Therefore, the wrong leveling carried out while the vehicle is at a stop is properly corrected, thereby making it possible to assure safe driving conditions both for the driver of the vehicle and those in approaching vehicles.

Furthermore, according to the first implementation of the invention, inappropriate pitch angle data might be determined as appropriate pitch angle data. However, according to the second implementation of the invention, such a risk can be eliminated, since the automatic headlamps leveling is carried out based on appropriate pitch angle data at all times. Thus, it is possible to assure safe running conditions both for the driver of the vehicle and those in approaching vehicles.

According to the third implementation of the invention, since the automatic headlamps leveling is carried out within a short length of time based on appropriate pitch angle data at all times, it is possible to assure safe running conditions both for the driver of the vehicle and those in approaching vehicles.

What is claimed is:

1. A headlamp leveling device for a vehicle comprising:

headlamps adapted to be driven by actuators such that light axes thereof are tilted up and/or down relative to the body of a vehicle;

control means for controlling the driving of said actuators;

vehicle speed detection means for detecting the speed of the vehicle;

pitch angle detection means provided either on a left or right suspension of either a front or rear wheel for detecting the pitch angle of the vehicle; and a storage part for storing pitch angle data of the vehicle detected by said pitch angle detection means;

said control means being adapted to control the driving of said actuators based on the pitch angle data detected by said pitch angle detection means such that the light axes of said headlamps always stay in a predetermined tilted state relative to the surface of a road;

wherein said control means determines whether the vehicle is being at a stop or is running based on outputs from said vehicle speed detection means and controls the driving of said actuators at certain intervals while the vehicle is being at a stop, whereas while the vehicle is running, only when the vehicle is running stably where a state continues for a given length of time in which the speed of the vehicle is equal to or more than a given value, while the acceleration of the vehicle is equal to or less than a given value, said control means controls the driving of said actuators based on pitch angle data taken during the stable running of the vehicle, said automatic vehicle headlamp leveling device is adapted to control the driving of said actuators only in a case where respective mean pitch angle data of a plurality of different cycle periods come to coincide with one another after said state continues for a given length of time in which the speed of the vehicle is equal to or more than a given value, while the acceleration of the vehicle is equal to or less than a given value.

2. A headlamp leveling device comprising:

headlamps adapted to be driven by actuators such that light axes thereof are tilted up and/or down relative to the body of a vehicle;

control means for controlling the driving of said actuators;

vehicle speed detection means for detecting the speed of the vehicle;

pitch angle detection means provided either on a left or right suspension of either a front or rear wheel for detecting the pitch angle of the vehicle; and a storage part for storing pitch angle data of the vehicle detected by said pitch angle detection means;

said control means being adapted to control the driving of said actuators based on pitch angle data detected by said pitch angle detection means such that the light axes of said headlamps always stay in a predetermined tilted state relative to the surface of a road;

wherein said control means determines whether the vehicle is being at a stop or is running based on outputs from said vehicle speed detection means and controls the driving of said actuators at certain intervals while the vehicle is being at a stop, whereas while the vehicle is running, only when the vehicle is running stably where a state continues for a given length of time in which the speed of the vehicle is equal to or more than a given value, while the acceleration of the vehicle is equal to or less than a given value, said control means controls the driving of said actuators based on pitch angle data taken during the stable running of the vehicle, said automatic vehicle headlamp leveling device is adapted to control the driving of said actuators only in a case where the speed of the vehicle is equal to or more than a given value and the acceleration thereof is equal to or less than a given value and where a state continues for a given length of time in which respective mean pitch angle data of a plurality of different cycle periods coincide with one another.

3. A headlamp leveling device of claim 1, wherein there are provided at least three different cycle periods, and mean pitch angle data of said respective different cycle periods are compared with one another.

4. A headlamp leveling device of claim 2, wherein there are provided at least three different cycle periods, and mean pitch angle data of said respective different cycle periods are compared with one another.

5. A headlamp leveling device for a vehicle comprising:

a headlamp;

an actuator for tilting the headlamp;

a pitch angle sensor for detecting pitch angle data of the vehicle; and a controller arranged to control the actuator to level the headlamp relative to a road surface;

wherein for the controller to control the actuator based on the pitch angle data detected while the vehicle is moving, the controller determines that a speed of the vehicle is equal to or more than a first value, an acceleration of the vehicle is equal to or less than a second value, and a difference between a first set of pitch angle data sampled over a duration and a second set of pitch angle data sampled over a different duration is within a third value.

6. The headlamp leveling device of claim 5 wherein for the controller to control the actuator, the controller further determines that the speed of the vehicle is equal to or more than the first value and the acceleration of the vehicle is equal to or less than the second value for a predetermined duration.

7. The headlamp leveling device of claim 5 wherein for the controller to control the actuator, the controller further determines that the difference between the first set of pitch angle data averaged over one duration and the second set of pitch angle data averaged over another duration is within the third value for a predetermined duration.

8. The headlamp leveling device of claim 5 wherein if the vehicle is stationary, the controller controls the actuator at certain intervals to level the headlamp relative to the road surface.

9. The headlamp leveling device of claim 5 further comprising:

a speed sensor for detecting the speed of the vehicle.

10. The headlamp leveling device of claim 9 wherein the controller determines whether the vehicle is stationary or is moving based on outputs from the speed sensor.

11. A headlamp leveling device of claim 5 wherein there are provided a third set of pitch angle data sampled over still a different duration.

12. A headlamp leveling device of claim 11 wherein for the controller to control the actuator, the controller further determines that a difference between the first set of pitch angle data and the third set of pitch angle data is within a fourth value, and a difference between the second set of pitch angle data and the third set of pitch angle data is within a fifth value.

* * * * *